March 19, 1957 D. C. ARNOLD ET AL 2,786,179
FLUX DETECTOR
Filed June 29, 1953 3 Sheets-Sheet 1

INVENTORS
DAVID C. ARNOLD
PAUL A. McKINLEY
BY
*Marr Moody*
ATTORNEY

INVENTORS
DAVID C. ARNOLD
PAUL A. McKINLEY
BY
ATTORNEY

United States Patent Office 2,786,179
Patented Mar. 19, 1957

2,786,179

FLUX DETECTOR

David C. Arnold and Paul A. McKinley, Cedar Rapids, Iowa, assignors to Collins Radio Company, Cedar Rapids, Iowa, a corporation of Iowa Application June 29, 1953, Serial No. 364,564

4 Claims. (Cl. 324—43)

This invention relates in general to magnetic measuring means and in particular to means for measuring the magnitude and/or direction of a magnetic field.

Devices previously developed for measuring magnetic fields, as for example the earth's magnetic field, have depended upon the magnetic saturation of a high permeability iron which is the sensing element. The present invention utilizes a ring or shielding element about the sensing element and an alternating field is impressed on the shielding element so as to periodically saturate the shield. The constant magnetic field which is being measured is thereby caused to vary within the limited region enclosed by the shield because the reluctance of the shield changes the amount of flux passing through the shield. Thus, at one instance the flux passes through the shield and in the next instance the flux is gathered into the shield and routed around the enclosed region.

It is an object of this invention, therefore, to provide means for measuring the magnitude and direction of a magnetic field.

Another object of this invention is to provide a more accurate magnetic measuring means which does not saturate the measuring elements.

Further features, objects and advantages of this invention will become apparent from the following description and claims when read in view of the drawings, in which:

Figure 1:
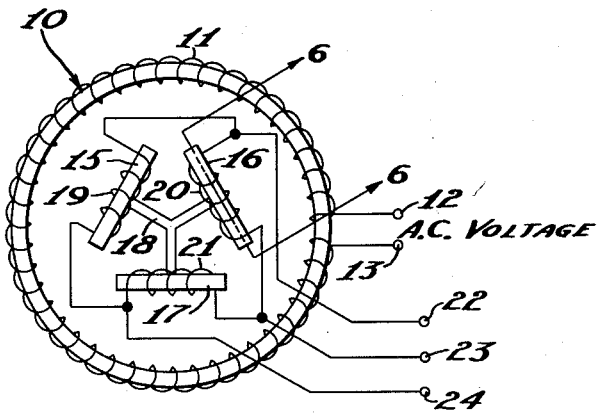
Figure 1 is a top view of the magnetic measuring apparatus of this invention.

Figure 1 illustrates a shielding means designated generally as 10 which might be annular in shape and formed of laminated iron or other suitable material which has a high permeability. A winding 11 is wound about the shielding means 10 and has a pair of input terminals 12 and 13 to which a suitable alternating current voltage is connected. This might be 28 volts 400 cycle alternating current, for example.

Three cylindrical cores 15, 16 and 17 are mounted on a Y-shaped supporting member 18 within the shielding means 10. The cores 15, 16 and 17 are mounted in a symmetrical fashion so that an extension of their axes would intersect at 60 degree angles.

Windings 19, 20 and 21 are wound about the cores 15, 16 and 17 and one end of the winding 19 is connected to one end of the winding 20 and this junction is brought out to a terminal 22. Likewise, the other end of the winding 20 is connected to the first end of winding 21 and this junction is brought out to a terminal 23. The other end of the winding 21 is connected to the other end of the winding 19 and this junction is brought out to a terminal 24.

Figure 2:
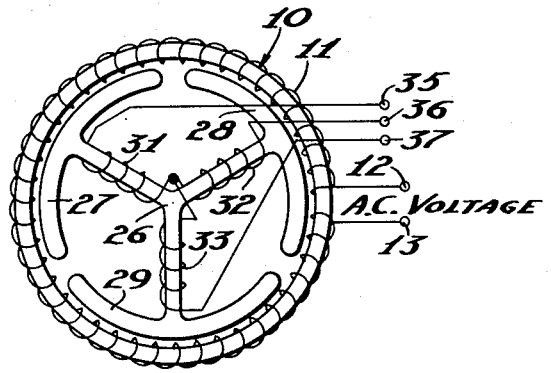
Figure 2 is a modification of the magnetic measuring apparatus of this invention.
Figure 3:
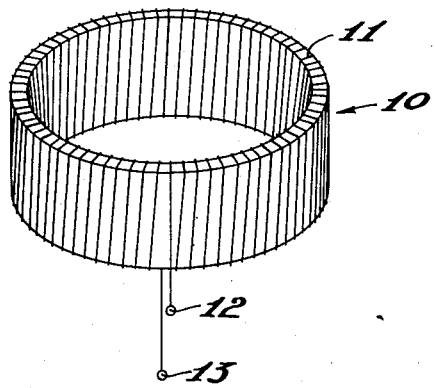
Figure 3 illustrates the shielding means.

A modification of this invention is shown in Figure 2 wherein the shielding means 10 is the same as in Figure 1 but the magnetic sensing means has been changed so that an internal Y-shaped member 26 is formed of magnetic material and supports at the end of each arm generally crescent shaped members 27, 28 and 29. Windings 31, 32 and 33 are wound about the legs of the Y-shaped member 26. The inner ends of the windings 31, 32 and 33 are connected together and their other ends are brought out to three terminals 35, 36 and 37.

Figure 4:
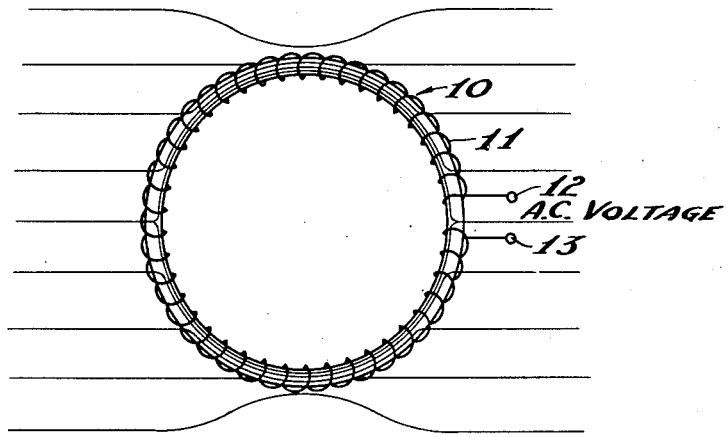
Figure 4 illustrates the flux distribution about the shield when it is unsaturated.

The terminals 12 and 13 are connected to a suitable alternating current source so that the shield is alternately saturated and unsaturated. When it is unsaturated, the external field being measured has a distribution such as shown in Figure 4, wherein the lines passing transversely of the shield will follow the shield rather than pass through it. This is because the shield when unsaturated has a reluctance that is lower than the air within the shield.

Figure 5:
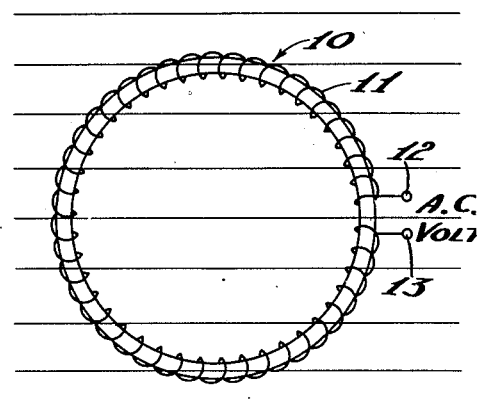
Figure 5 illustrates the flux distribution when the shield is saturated.

When the shield is saturated, however, the reluctance becomes greater and the flux will have the pattern shown in Figure 5. Thus, as the alternating current voltage applied to terminals 12 and 13 is varied, the magnetic field being measured will alternately pass through and not pass through the shielding means.

Figure 6:
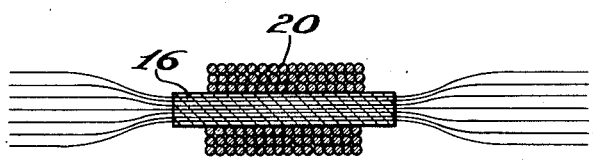
Figure 6 is a sectional view taken on line 6—6 of Figure 1.

One of the magnetic sensing elements 15, 16 and 17 is shown in section in Figure 6. It measures the change in flux passing through the longitudinal axis. By comparing the change in flux passing through the axes of the three cores 15, 16 and 17, the angle from which the flux is received may be determined. This is true because the flux passing through the core, if changing, induces a voltage in the windings 19, 20 and 21.

Thus, the shielding means and winding 11 when excited by an alternating current voltage, operate as a gate which alternately allows the external flux to pass through the shielding means and then turns it off. This provides a changing flux which is necessary to induce a voltage in the windings 19, 20 and 21 which may be used for measuring purposes.

Figure 7:
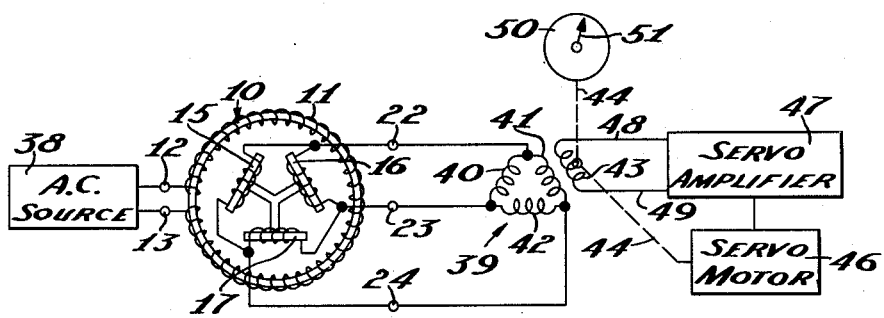
Figure 7 illustrates the magnetic measuring means of this invention connected in circuit with a closed loop servo to form a compass.

Figure 7 illustrates the measuring means of this invention with the terminals 12 and 13 connected to a suitable alternating current source 38 and the terminals 22, 23 and 24 electrically connected to a synchro designated generally as 39 which has windings 40, 41 and 42 that might be connected to its stator, for example. A rotor 43 of the synchro is connected to the output shaft 44 of a servomotor 46 which receives an electrical input from a servo amplifier 47 which is connected to the output of rotor 43 by leads 48 and 49. Shaft 44 is also connected to an indicating dial 50 which has a needle 51 that rotates with the shaft 44 to indicate the direction of the magnetic field being tested by the structure. For example, the structure shown in Figure 7 may be used as a magnetic compass to continually indicate heading.

Figure 8:
Figure 8 illustrates the applied voltage to the shielding means.
Figure 9:
Figure 9 illustrates the flux versus time relationship of the flux in the shielding means.
Figure 10:
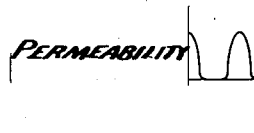
Figure 10 illustrates the permeability versus time wave shape in the shield.
Figure 11:
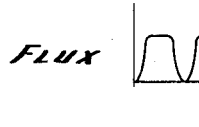
Figure 11 illustrates the flux versus time relationship passing through the shield; and, Figure 12 illustrates the induced voltage within the sensing element when plotted against time.
Figure 12:

Figure 8 illustrates the wave shape of the applied voltage to terminals 12 and 13 from the generator 38 and Figure 9 illustrates the flux versus time relationship in the shield 10 as it is driven to saturation by the applied voltage. Figure 10 illustrates the permeability versus time relation in the shielding means. Figure 11 illustrates the amount of flux within the shield plotted against time. Figure 12 illustrates the induced voltage within the windings 15, 16 and 17 as plotted against time.

It is to be particularly noted that there is little or no magnetic connection between the shielding coil 11 and the detection coils 15, 16 and 17. It is also to be noted that since the applied alternating current voltage saturates the shield in two directions, that the frequency of the output is doubled.

The field being measured is the only field which induces voltages in the pick-up coils and thus much greater accuracy is obtained than with previous devices where the pick-up structure was driven to saturation.

It is seen that this invention provides an improved magnetic measuring means wherein improved accuracy may be obtained by the addition of a shielding element about flux sensing means so as to periodically allow the flux being measured to pass therethrough. The sensing means are not saturated as has been previously done and thus the accuracy is greatly increased.

Although it has been described with respect to a particular embodiment thereof, it is not to be so limited as changes and modifications may be made therein which are within the full intended scope of the invention as defined by the appended claims.

We claim:

1. A flux detector comprising, an annuler member of magnetic material, a first winding wound about said annular member, an alternating voltage source connected to said first winding, a flux detector mounted within said annular member and comprising a plurality of windings angularly spaced relative to each other so as to indicate the direction of an unknown magnetic flux.

2. A flux detector comprising a Y-shaped supporting member, three cores attached, respectively, to opposite ends of said Y-shaped supporting member and adjusted so their axes are spaced sixty degrees from each other, an annular shielding member enclosing said Y-shaped supporting member and cores, a first winding wound about said annular shielding member, an alternating voltage supply connected to said first winding, second, third and fourth windings wound, respectively, about the second, third and fourth cores, and the second, third and fourth windings connected in series.

3. Means for measuring an unknown magnetic field comprising, a Y-shaped supporting member, first, second and third cores attached to the ends of said Y-shaped supporting member, a shielding member mounted about said cores and Y-shaped supporting member, a first winding wound about said shielding member, an alternating voltage source connected to said first winding, second, third and fourth windings connected in series and wound, respectively, about the cores, first, second and third terminals connected, respectively, to the junction between the first, second and third windings.

4. A magnetic flux detector comprising, a shielding member, a first winding wound about said shielding member, an alternating voltage supply connected to said first winding, a Y-shaped member made of magnetic material supported within said shielding member, three crescent members attached to the ends of said Y-shaped member, second, third and fourth windings mounted on the Y-shaped member on the respective legs thereof, the inner ends of said second, third and fourth windings connected together, and three terminals connected, respectively, to the other ends of said second, third and fourth windings.

References Cited in the file of this patent

UNITED STATES PATENTS

| 2,437,132 | Sinks | Mar. 2, 1948 |
| 2,439,701 | Stuart | Apr. 13, 1948 |
| 2,585,956 | McCarthy | Feb. 19, 1952 |
| 2,659,859 | Heiland | Nov. 17, 1953 |

FOREIGN PATENTS

| 538,703 | Great Britain | Aug. 13, 1941 |